R. N. MOORE.
HOE.
APPLICATION FILED SEPT. 6, 1917.
1,256,352.
Patented Feb. 12, 1918.
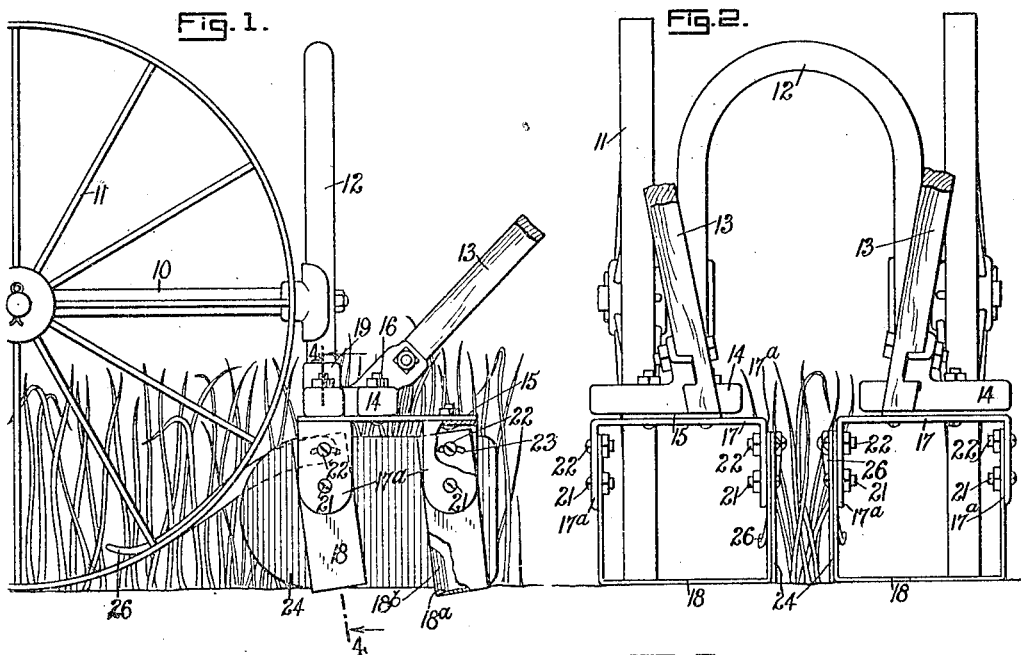
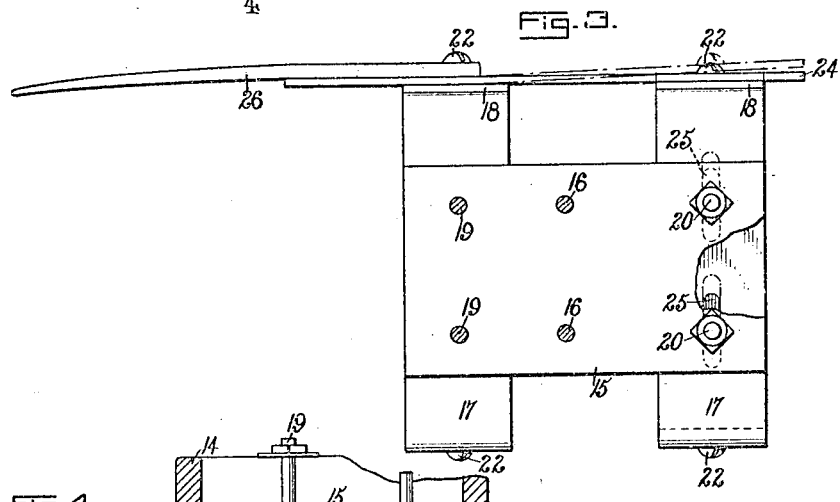
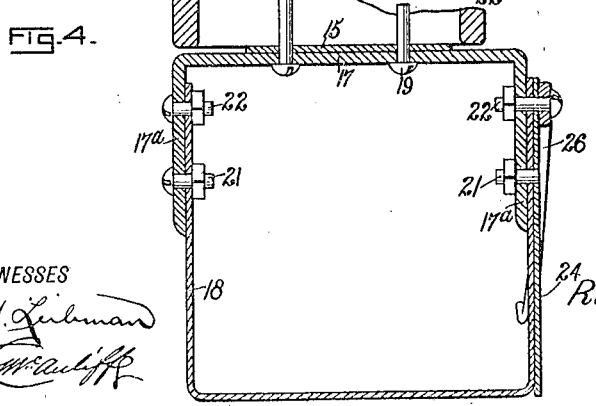
WITNESSES
INVENTOR
Rinaldo N. Moore
BY
ATTORNEYS

UNITED STATES PATENT OFFICE.

RINALDO N. MOORE, OF MITCHELL, IOWA.

HOE.

1,256,352.  Specification of Letters Patent.  Patented Feb. 12, 1918.

Application filed September 6, 1917. Serial No. 189,989.

*To all whom it may concern:*

Be it known that I, RINALDO N. MOORE, a citizen of the United States, and a resident of Mitchell, in the county of Mitchell and State of Iowa, have invented a new and Improved Hoe, of which the following is a full, clear, and exact description.

My invention relates to wheeled hoes and more particularly relates to an attachment to be applied to the frame of standard makes of wheeled hoes.

An object of the invention is to provide hoe elements adapted to be readily applied to the ordinary frame, and having a form and an adaptability of adjustment whereby to effectively perform the work of hoeing at opposite sides of a row of plants.

A further important object of the invention is to combine with front and rear hoe elements and their attaching means a shield to prevent injury to the plants.

The invention also has for objects to provide for a lateral relative adjustment of the front and rear hoe elements at a side of the plants, and to provide a novel and effective leaf lifting means associated with my improved hoe attachment.

Reference is to be had to the accompanying drawings forming a part of this specification in which similar reference characters indicate corresponding parts in all the views, it being understood that the drawings are merely illustrative of one example of the invention.

Figure 1 is a side elevation of the rear part of a wheeled hoe frame having my attachment applied thereto, parts being broken away;

Fig. 2 is a rear elevation with parts of the usual handles broken away;

Fig. 3 is a sectional plan view showing one of my hoe attachments, parts being broken away;

Fig. 4 is a transverse vertical section on the line 4—4, Fig. 1.

The numeral 10 indicates a known form of hoe frame having wheels 11, an arch 12, and handles 13, the numeral 14 indicating the rear portions of the frame 10 to which my attachments are applied.

In carrying out my invention in accordance with the illustrated example plates 15 are provided as means for carrying the hoes, said plates being secured to the frame parts 14 at the sides of the arch 12 by bolts 16 between the forward and rear ends of said plates 15. To the under side of each plate 15 are secured front and rear brackets 17 each consisting of a top cross bar and depending standards 17$^a$ thereon at the sides, and to said standards U-shaped knives 18 are secured, the transverse lower portion of each constituting a cutting element adapted to enter the ground while the upstanding members are secured to the standards 17$^a$. In addition to the bolts 16, front bolts 19 and rear bolts 20 secure each plate 15 to a frame member 14 and said bolts serve also to secure the front and rear brackets 17 to a plate 15.

In practice, the forward knife 18 on a plate 15 will cut into the ground to a slightly less depth than the rear knife. Each knife 18 is so secured to the adjacent standards 17$^a$ as to permit the knives to be adjusted to have more or less pitch relatively to a vertical plane. In the illustrated form bolts 21 or equivalent means pivotally secure the upstanding members of each knife to the standards 17$^a$ and in addition above the said bolts 21 a slot and pin connection is effected between the standards and knives, there being provided bolts 22 passing through said standards and through arcuate slots 23 in the knives as clearly shown in Fig. 1. Thus, the knives may have pivotal movement about the bolts 21. The tightening up of the said bolts 21 and the bolts 22 will serve to tightly hold the knives in a given angular adjustment. At the inner sides of each set of knives 18 the respective knives have secured thereto a shield 24, the bolts 21, 22 serving to hold the shield to the knives and to the standards 17$^a$.

In order to adjust the rear knives 18 transversely with respect to the forward knives 18 to approach the row of plants more or less than the front knives, each rear bracket 17 is adapted to be moved laterally on its carrying plate 15 for which purpose the said rear bracket is formed with transverse slots 25, through which the rear bolts 20 pass, the said slots permitting the rear brackets 17 and knives 18 to be moved transversely relatively to the path of travel, the looseness of the securing bolts of the shield 24, permitting the said shield to assume the position shown in dotted lines, Fig. 3, or in the opposite direction from the full line position.

In order to lift the leaves of the row of plants at each side, I provide leaf lifters 26 in the form of fingers, preferably curved upwardly at their front ends, the said fingers being secured at their rear ends to the hoe attachment by any approved means, the front bolts 22 being availed of for the purpose in the illustrated construction. It will be seen that the fingers dip forwardly from their rear ends, whereby to enter beneath the side leaves of the plants for raising the same in advance of the knives and shield.

With the above construction a pair of knives is arranged at each side of the row of plants, each set of knives having its shield and leaf lifter. The adjustments provided for insure a successive action of the knives on the ground at different depths and the front knives may be made to more closely approach the row of plants than the rear knives or vice versa.

The knives 18 are sharpened at the upper surface of the transverse portions as at 18ª in Fig. 1 and for a short distance at the inner side of the upright portions as at 18ᵇ.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A hoe attachment including a plate, a transverse bracket carried by said plate at the front, a second transverse bracket carried by said plate in the rear of the first bracket, means independent of the brackets to detachably secure said plate between the ends thereof to a wheeled frame so that the brackets are attachable and detachable with the plate, depending standards on the said brackets at the ends thereof, means to adjust the rear bracket on said plate transversely relatively to the front bracket, and U-shaped knives presenting upstanding side arms secured to the said standards, and adjustable thereon to vary the angular positions of said U-shaped knives relatively to a vertical plane.

2. A hoe attachment including front and rear knives, means carrying said knives and adapted to be secured to a wheeled frame, the said knives being relatively adjustable transversely on the said means and presenting transverse cutting members at the bottom and members extending upwardly from the cutting members, and a longitudinally extending shield disposed at the inner side of said knives and secured to the upwardly extending members thereof to partake of the relative lateral adjustment of the knives.

3. A hoe attachment including a transverse bracket, depending standards on said bracket, a knife presenting upstanding members at the sides, and leaf lifting devices in the form of fingers secured to said standards adjacent to the upper ends of the said upstanding members and extending forwardly and downwardly therefrom.

4. A hoe attachment including front and rear knives presenting transverse cutting members at the bottom and upstanding members, means on which said upstanding members are carried, said means being adapted to be secured to a hoe frame, and a shield extending longitudinally along said knives at a side thereof and secured thereto, the rear knife being laterally adjustable relatively to the front knife, and the said shield being yieldable to said adjustment of the rear knife.

5. A hoe attachment including a plate adapted to be secured to a hoe frame, a front bracket secured to said plate at the forward end, depending standards on said bracket, a second bracket rearward of the first bracket, and connected with the said plate by a slot and pin connection to permit said second bracket to be moved transversely relatively to the said plate and knives each presenting a transverse cutting member at the bottom, and upwardly extending members, transverse pivot bolts extending through said upwardly extending members and standards, and additional bolts securing the said members to the standards, said members having arcuate slots through which the said additional bolts pass to permit tilting of the knives.

RINALDO N. MOORE.

Copies of this patent may be obtained for five cents each, by addressing the "Commissioner of Patents, Washington, D. C."